United States Patent
McGrath et al.

(10) Patent No.: US 11,012,499 B2
(45) Date of Patent: May 18, 2021

(54) TEMPLATE DIRECTORIES FOR CARTRIDGES IN A MULTI-TENANT PLATFORM-AS-A-SERVICE (PAAS) SYSTEM

(71) Applicant: Red Hat, Inc., Raleigh, NC (US)

(72) Inventors: Michael McGrath, Schaumburg, IL (US); Jhon Honce, Cave Creek, AZ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/187,764

(22) Filed: Feb. 24, 2014

(65) Prior Publication Data

US 2015/0193324 A1  Jul. 9, 2015

Related U.S. Application Data

(60) Provisional application No. 61/925,381, filed on Jan. 9, 2014.

(51) Int. Cl.
*G06F 9/54* (2006.01)
*G06F 8/656* (2018.01)
(Continued)

(52) U.S. Cl.
CPC .............. *H04L 67/10* (2013.01); *G06F 8/656* (2018.02); *G06F 9/45558* (2013.01);
(Continued)

(58) Field of Classification Search
CPC ...... G06F 11/3409; G06F 9/455; G06F 9/541; G06F 8/60–70
(Continued)

(56) References Cited

U.S. PATENT DOCUMENTS 6,216,258 B1 * 4/2001 Mohan et al. ................ 716/117
7,313,786 B2 * 12/2007 Richards, Jr. ......... G06F 9/5072
717/115
(Continued)

OTHER PUBLICATIONS

Wang, T., et al., Towards PaaS Using Service-Oriented Component Model, Internetware '10: Proceedings of the Second Asia-Pacific Symposium on Internetware, Nov. 2010, pp. 1-4, [retrieved on Jan. 19, 2021], Retrieved from the Internet: <URL: http://dl.acm.org/>.*
(Continued)

*Primary Examiner* — Geoffrey R St Leger
(74) *Attorney, Agent, or Firm* — Womble Bond Dickinson (US) LLP

(57) ABSTRACT

Implementations for template directories for cartridges in a multi-tenant Platform-as-a-Service (PaaS) system are disclosed. A method of the disclosure includes maintaining, by a node executed by a processing device, a cartridge library comprising cartridge packages that provide functionality for applications executed by the node for a multi-tenant Platform-as-a-Service (PaaS) system, embedding, by the node, a cartridge instance from the cartridge library in a gear of the node, providing, via the cartridge instance, a template directory to an application utilizing the cartridge instance on the node, and executing, by the node, a sample application from the template directory to demonstrate functionality of the cartridge instance to an application developer of the application.

20 Claims, 6 Drawing Sheets

(51) Int. Cl.
*H04L 12/24* (2006.01)
*G06F 9/455* (2018.01)
*H04L 29/08* (2006.01)
*G06F 16/11* (2019.01)
*G06F 16/178* (2019.01)
*G06F 16/182* (2019.01)
*G06F 16/21* (2019.01)
*G06F 16/23* (2019.01)
*G06F 11/34* (2006.01)
*H04L 29/06* (2006.01)

(52) U.S. Cl.
CPC ............ *G06F 9/541* (2013.01); *G06F 16/122* (2019.01); *G06F 16/178* (2019.01); *G06F 16/182* (2019.01); *G06F 16/219* (2019.01); *G06F 16/2329* (2019.01); *H04L 41/082* (2013.01); *H04L 67/06* (2013.01); *H04L 67/34* (2013.01); *G06F 11/3409* (2013.01); *G06F 2009/45595* (2013.01); *G06F 2209/544* (2013.01); *H04L 63/08* (2013.01)

(58) Field of Classification Search
USPC .............. 717/120, 127, 168–178; 718/1, 100
See application file for complete search history.

(56) References Cited

U.S. PATENT DOCUMENTS

| | | | |
|---|---|---|---|
| 9,063,746 B2* | 6/2015 | Yousouf | G06F 8/36 |
| 9,189,224 B2 | 11/2015 | Ravi | |
| 2003/0188040 A1* | 10/2003 | Vincent | G06F 9/455 |
| | | | 719/317 |
| 2005/0114834 A1* | 5/2005 | Richards, Jr. | G06F 9/5072 |
| | | | 717/114 |
| 2005/0120025 A1 | 6/2005 | Rodriguez | |
| 2005/0197931 A1* | 9/2005 | Gupta | G06Q 40/00 |
| | | | 705/30 |
| 2007/0156670 A1 | 7/2007 | Lim | |
| 2010/0036889 A1 | 2/2010 | Joshi | |
| 2010/0287529 A1* | 11/2010 | Costa et al. | 717/105 |
| 2011/0184993 A1 | 7/2011 | Chawla | |
| 2011/0185014 A1 | 7/2011 | Eccles | |
| 2011/0295984 A1 | 12/2011 | Kunze | |
| 2012/0066670 A1 | 3/2012 | McCarthy | |
| 2012/0185821 A1 | 7/2012 | Yaseen | |
| 2012/0303807 A1 | 11/2012 | Akelbein | |
| 2012/0324069 A1 | 12/2012 | Nori | |
| 2013/0138810 A1 | 5/2013 | Binyamin | |
| 2013/0185706 A1* | 7/2013 | Dominick | 717/168 |
| 2013/0227561 A1 | 8/2013 | Walsh | |
| 2013/0227563 A1 | 8/2013 | McGrath | |
| 2013/0297672 A1 | 11/2013 | McGrath et al. | |
| 2013/0297685 A1 | 11/2013 | McGrath et al. | |
| 2013/0298183 A1 | 11/2013 | McGrath et al. | |
| 2013/0326507 A1 | 12/2013 | McGrath et al. | |
| 2013/0346945 A1* | 12/2013 | Yousouf | G06F 8/36 |
| | | | 717/121 |
| 2014/0075426 A1 | 3/2014 | West et al. | |
| 2014/0075432 A1 | 3/2014 | McGrath et al. | |
| 2014/0149485 A1 | 5/2014 | Sharma | |
| 2014/0156519 A1 | 6/2014 | Thompson | |
| 2014/0173554 A1 | 6/2014 | Gupta | |
| 2014/0196044 A1 | 7/2014 | Fernando | |
| 2014/0289391 A1 | 9/2014 | Balaji et al. | |
| 2015/0020061 A1 | 1/2015 | Ravi | |
| 2015/0160977 A1* | 6/2015 | Accapadia et al. | G06F 9/50 |
| 2015/0178065 A1* | 6/2015 | Valkov et al. | G06F 8/65 |
| 2015/0193452 A1 | 7/2015 | McGrath et al. | |
| 2015/0193481 A1 | 7/2015 | McGrath et al. | |
| 2015/0195337 A1 | 7/2015 | McGrath et al. | |
| 2015/0242199 A1 | 8/2015 | Goldstein et al. | |

OTHER PUBLICATIONS

Quinton, C., et al., Towards Multi-Cloud Configurations Using Feature Models and Ontologies, MultiCloud '13: Proceedings of the 2013 international workshop on Multi-cloud applications and federated clouds, Apr. 2013, pp. 21-26, [retrieved on Jan. 19, 2021], Retrieved from the Internet: <URL:http://dl.acm.org/>.*

Hauck, F., et al., The COSCA PaaS platform: On the way to flexible and dependable cloud computing, EWDCC '12: Proceedings of the 1st European Workshop on Dependable Cloud Computing, May 2012, pp. 1-2, [retrieved on Jan. 19, 2021], Retrieved from the Internet: <URL:http://dl.acm.org/>.*

Lawton, G., Developing Software Online with Platform-as-a-Service Technology, Computer, vol. 41, Issue: 6, Jun. 2008, pp. 13-15, [retrieved on Jan. 19, 2021], Retrieved from the Internet: <URL:http://ieeexplore.ieee.org/>.*

USPTO, Notice of Allowance, U.S. Appl. No. 14/188,772, dated Sep. 23, 2015, 7 pages.

USPTO, Office Action for U.S. Appl. No. 14/183,835, dated Jan. 20, 2016.

USPTO, Final Office Action for U.S. Appl. No. 14/183,835, dated May 20, 2016.

USPTO, Advisory Action for U.S. Appl. No. 14/183,835, dated Jul. 25, 2016.

USPTO, Office Action for U.S. Appl. No. 14/187,826, dated May 2, 2016.

USPTO, Office Action for U.S. Appl. No. 14/183,835, dated Nov. 17, 2016.

USPTO, Notice of Allowance for U.S. Appl. No. 14/183,835, dated Mar. 22, 2017.

USPTO, Final Office Action for U.S. Appl. No. 14/187,826, dated Dec. 1, 2016.

USPTO, Advisory Action for U.S. Appl. No. 14/187,826, dated Mar. 6, 2017.

USPTO, Office Action for U.S. Appl. No. 15/009,574, dated Dec. 14, 2016.

* cited by examiner

400 

Maintain a cartridge library including cartridge packages that provide functionality for applications executed by a multi-tenant PaaS
410

Embed a cartridge instance of the cartridge library in a gear of the multi-tenant PaaS, the gear including a resource-constrained processing space to execute an application that utilizes the cartridge
420

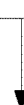

Provide, via the cartridge instance, a template directory to the application
430

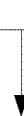

Execute a sample application from the template directory to demonstrate functionality of the cartridge instance for the application
440

Provide a sample application, default marker files, and action hooks as part of a template directory of a cartridge instance embedded in a gear of an application of the multi-tenant PaaS
510

Receive an updated version of the sample application that is customized by an application developer of the application
520

Access marker files of the cartridge that are based on the default marker files provided in the template directory and that have been modified
530

Access action hooks of the cartridge that are based on the action hooks provided in the template directory and that have been modified
540

Execute the application on the multi-tenant PaaS utilizing the updated version of the sample application, the accessed marker files, and the accessed action hooks
550

*Figure 5*

TEMPLATE DIRECTORIES FOR CARTRIDGES IN A MULTI-TENANT PLATFORM-AS-A-SERVICE (PAAS) SYSTEM

RELATED APPLICATION

This application claims the benefit under 35 U.S.C. § 119(e) of U.S. Patent Provisional Application No. 61/925,381, filed on Jan. 9, 2014, the entirety of which is incorporated herein by reference.

TECHNICAL FIELD

The implementations of the disclosure relate generally to computing infrastructures and, more specifically, relate to template directories for cartridges in a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 4 is a flow diagram illustrating a method for providing a sample application of a cartridge in a template directory of the cartridge in a multi-tenant PaaS system according to an implementation of the disclosure.

FIG. 5 is a flow diagram illustrating a method for executing an application in a multi-tenant PaaS system by utilizing a template directory of a cartridge providing functionality of the application, according to an implementation of the disclosure.

DETAILED DESCRIPTION

Implementations of the disclosure provide template directories for cartridges in a multi-tenant Platform-as-a-Service (PaaS) system. In one implementation, a cartridge of the PaaS system may be written by a cartridge author and utilized in deployed applications created by by application developers. A cartridge can represent a form of support software (or middleware) providing functionality, such as configuration templates, scripts, and/or dependencies, to run an application and/or add a feature to an application that is hosted by the PaaS. When creating a cartridge, the cartridge author may include a template directory as part of the cartridge. The template directory may include a minimal example of an application written in the language/framework that cartridge is packaging. The sample application of the template directory may welcome the application developer to the cartridge and let the application developer see that the cartridge has been installed and operates on the VM provided by the PaaS.

Previous implementations of PaaS systems did not provide cartridges that provided an introduction to the cartridge or a sample application that could be used by the application developer. Instead, when an application developer selected and installed a cartridge instance, the cartridge instance did not provide any indications that the cartridge was operating correctly or any explanation of the features of the cartridge. Implementations of the disclosure allow for an improved user experience in a multi-tenant PaaS by providing a template directory as part of the cartridge instance, where the template directory includes a sample application that can be modified and executed by the application developer for improved development and deployment speed for the application created by the application developer.

Figure 1:
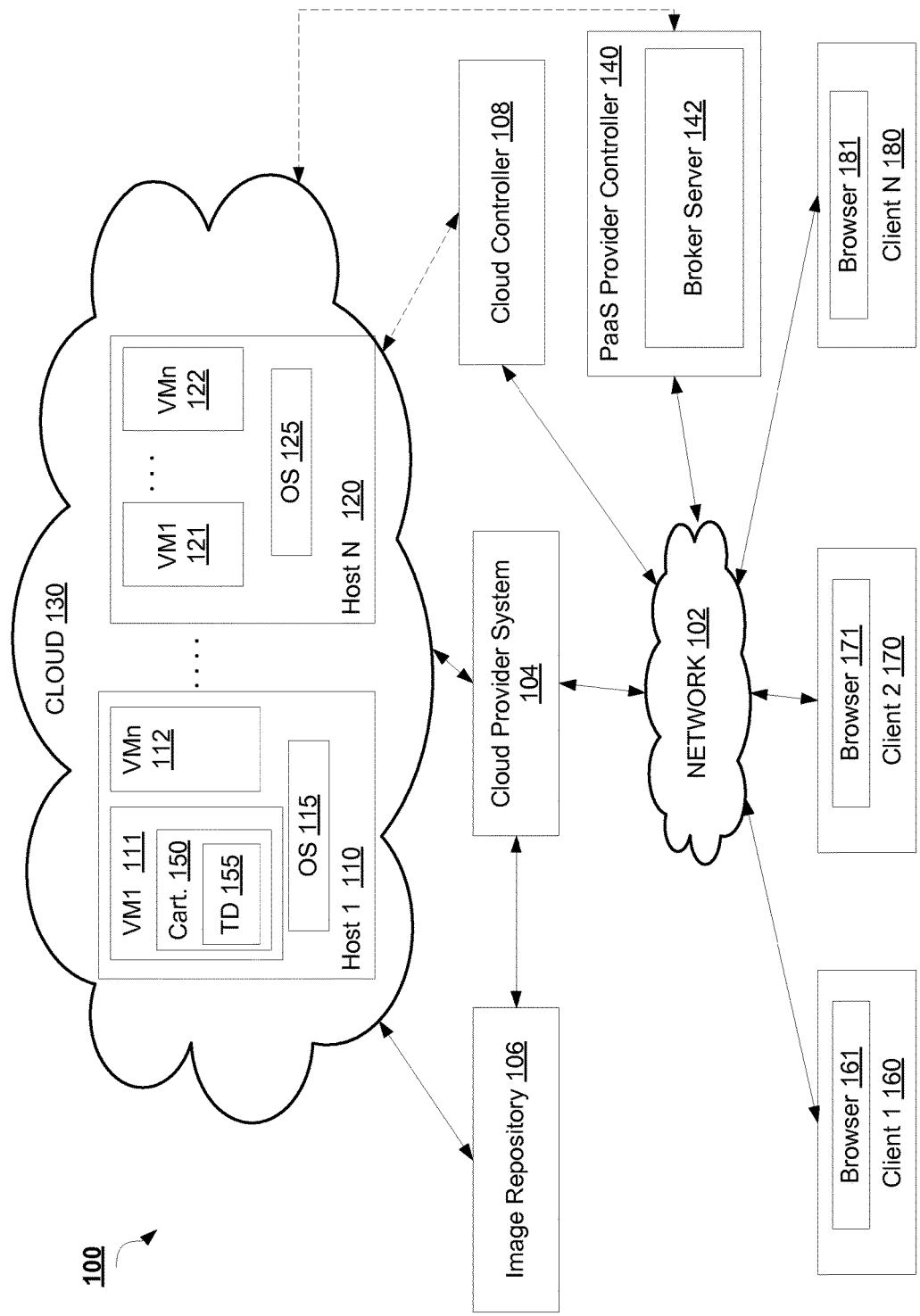
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data is used for the execution of applications for a multi-tenant PaaS system managed by the PaaS provider controller 140.

In one implementation, a cartridge 150 of the PaaS system may be written by a cartridge author and utilized in deployed applications created by application developers. A cartridge can represent a form of support software (or middleware) providing functionality, such as configuration templates, scripts, and/or dependencies, to run an application and/or add a feature to an application that is hosted by the PaaS. When creating a cartridge 150, the cartridge author may include a template directory (TD) 155 as part of the cartridge. The template directory 155 may include a minimal example of an application written in the language/framework that cartridge 150 is packaging. The sample application of the template directory 155 may welcome the application developer to the cartridge 150 and let the application developer see that the cartridge 150 has been installed and operates on the VM 111 provided by the PaaS In some implementations, the template directory also includes marker files and action hooks that may be utilized by the application developer. A marker file may include an empty file that is labeled as a "marker" to indicate to a controller component that the cartridge instance is to implement a particular action or functionality. When a cartridge of the application identifies the marker file, the cartridge implements the corresponding action or functionality for the particular cartridge. An action hook may refer to functionality (e.g., software code) that intercepts function calls, events, or messages passed between components, such as the cartridge and the PaaS system, in order to alter or augment the behavior of the cartridge. The action hook allows an application developer to add his or her own custom code to make changes and/or add features to the cartridge functionality in order to customize the application utilizing the cartridge to the application developer's preferences.

In one implementation, when the template directory 155 is provided as source code with the cartridge 150, the PaaS transforms the template directory into a bare git repository for use by the application developer. In another implementation, when the template directory 155 is provided as a template.git directory with cartridge 150, the PaaS directly copies the template directory 155 for use by the application developer. Further details of template directories for cartridges in a multi-tenant PaaS system are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
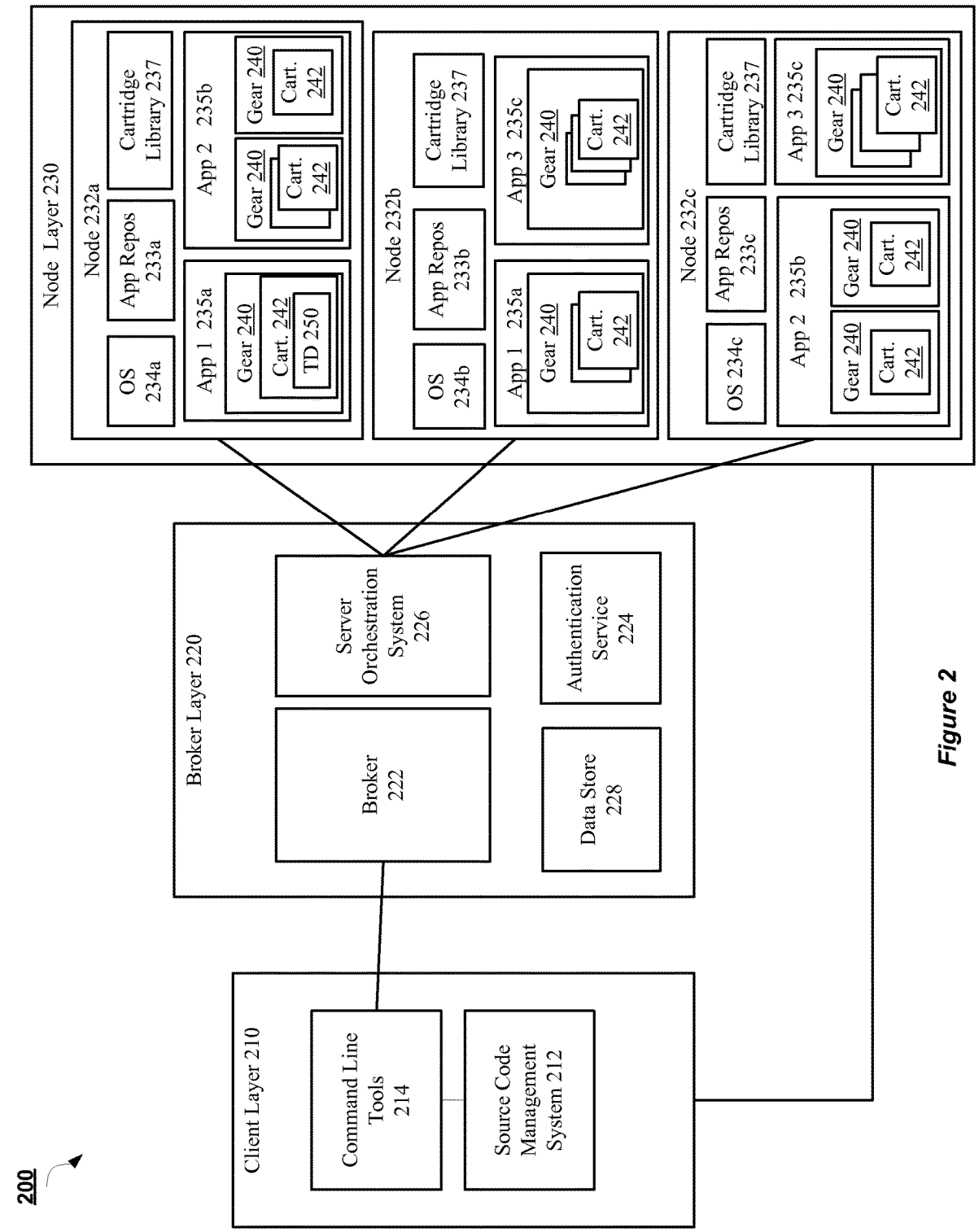
FIG. 2 is a block diagram of a Platform-as-a-Service (PaaS) system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 make use of an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure-as-a-Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command line tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client command line tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, and/or dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance 242 of a cartridge from cartridge library 237 to an application 235a-c provides a capability for the application 235a-c, without the customer who owns the application having to administer or update the included capability. In one implementation, cartridge instance 242 is the same as cartridge 150 described with respect to FIG. 1. Cartridge instance 242 may be more generally referred to as a "cartridge" throughout the description.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent (not shown) at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

In one implementation, a cartridge (that is deployed as cartridge instances 242) of the PaaS system may be written by a cartridge author and utilized in deployed applications created by application developers. As part of creating a cartridge 242, the cartridge author may include a template directory (TD) 250 as part of the cartridge. The template directory 250 may be the same as template directory 155 described with respect to FIG. 1.

Figure 3:
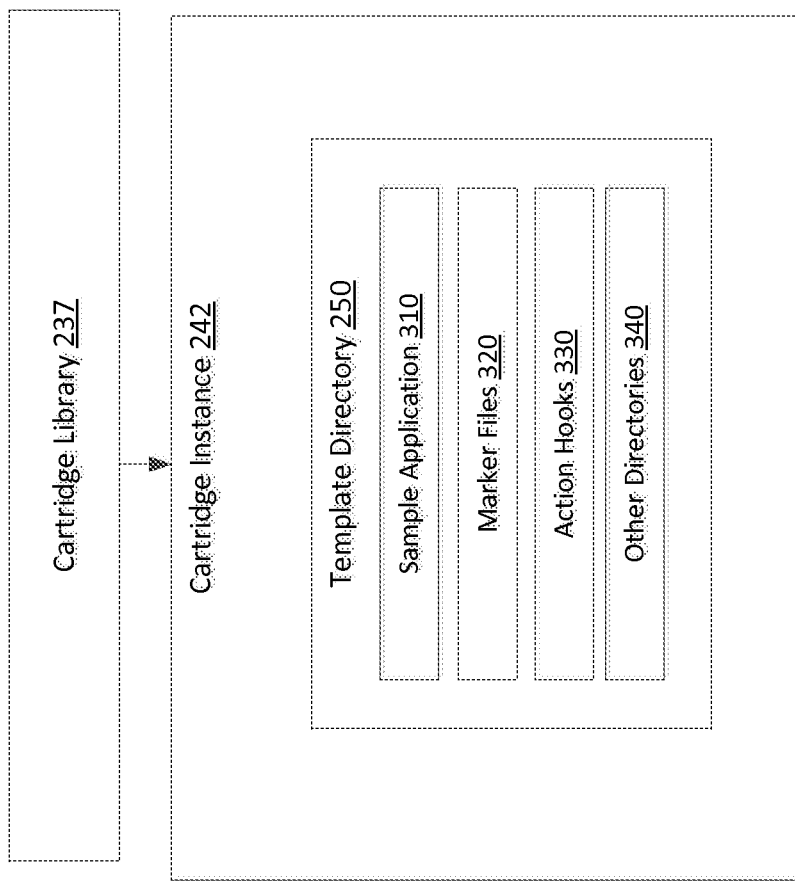
FIG. 3 is a block diagram of a communication architecture of a multi-tenant PaaS for providing template directories for cartridges in the multi-tenant PaaS system according to an implementation of the disclosure.

FIG. 3 is a block diagram illustrating a cartridge instance 242 deployed on a node of the multi-tenant PaaS that implements template directories according to implementations of the disclosure. Cartridge instance 242 may be deployed from a cartridge library 237 maintained on a node (e.g., VM) of the multi-tenant PaaS system. Cartridge instance 242 may include a template directory 250. As shown, template directory 250 may include a sample application 310, marker files 320, action hooks 330, and other directories 340. The other directories 340 may store the functionality of the cartridge 242 that provides the configuration templates, scripts, and/or dependencies, to run the application utilizing the cartridge or to add a feature to an application utilizing the cartridge.

The sample application 310 may include a minimal example of an application written in the language/framework that cartridge 242 is packaging. The sample application 310 of the template directory 250 may welcome an application developer utilizing a cartridge instance of the cartridge 242 and let the application developer see that the cartridge 242 has been installed and operates correctly on the gear 240 of the multi-tenant PaaS. This provides the application developer with an "experience" in terms of installing and utilizing the cartridge. The sample application 310 may be utilized as a template for the application developer's application and customized for the application developer's application. In this respect, the application developer does not have to start from scratch in building his or her own application utilizing the cartridge 242.

In one implementation, when the template directory 250 is provided as source code with the cartridge 242, the PaaS system transforms the template directory 250 into a bare source code management (SCM) repository (e.g., git repository) for use by the application developer. In another implementation, when the template directory 155 is provided in the format of an SCM repository directory (e.g., as a template.git directory) with the cartridge 242, the PaaS may directly copy the template directory 250 for use by the application developer.

In some implementations, when the template directory 250 is provided as source code with the cartridge 242, the cartridge author may modify the template directory to customize it for the application developer that is utilizing the cartridge 242 for his or her application. The cartridge author is able to modify the template directory in real-time while the cartridge is served by the PaaS system. This allows the cartridge author to control and update the look and feel of a provided cartridge (e.g., to match branding of a product, etc.). In comparison, if the template directory is provided in the format of an SCM repository directory, the cartridge author is not able to modify the template directory on-the fly. However, a benefit of providing the template directory in the format of an SCM repository is that the SCM repository format saves time during the cartridge installation process (as the PaaS system does not have to build the SCM repository for the template directory), especially for cartridges related to large web frameworks.

In some implementations, the template directory 250 also includes marker files 320 and action hooks 330 that may be utilized for applications created by the application developer. A marker file 320 may include an empty file that is labeled as a "marker" to indicate to a controller component (e.g., broker layer) of the PaaS system that the application is to implement a particular action or functionality. When a cartridge of the application identifies the marker file 320, the cartridge implements the corresponding action or functionality for the particular cartridge.

Including marker files 320 in the template directory 250 allows the cartridge author to establish example behaviors for the cartridge 242 that applications created by the application developer honor during the lifecycle of the cartridge 242 instance for the application. The marker files 320 in the template directory 250 provide a set of default behaviors for the cartridge 242 that can be modified, added to, or deleted from, in order to establish the behavior of the cartridge 242 when code of an application is pushed back to the PaaS system to execute.

Examples of marker files 320 may include a "force clean build" marker file that indicates that the cartridge 242 should remove any previously-built artifacts before starting a next build of the application. Another example marker file 320 is a "hot deploy" marker file that indicates that the cartridge 242 should perform a minimal restart in order to pick of code changes to the application, including skipping any non-required packaging steps. A further example marker file 320 is a "disable auto scaling" marker file that indicates that the cartridge 242 should prevent scalable application from scaling up or down according to application load An action hook 330 may provide functionality (e.g., software code) that intercepts function calls, events, or messages passed between components (e.g., between the cartridge and the PaaS system) in order to alter or augment the behavior of the cartridge 242. The action hooks 330 allow custom code to be added to an application, where the custom code makes changes and/or adds features to the cartridge 242 functionality during lifecycle changes of the cartridge. In one implementation, the application developer may add the custom code. The action hooks 330 contain software code to run during cartridge lifecycle changes in order to make changes to the cartridge 242 functionality or add features to the cartridge 242. Examples include pre_start_'cartridge name', post_start_'cartridge name', pre_stop_'cartridge name', etc.

When the cartridge author places action hooks 330 into the template directory 250, the cartridge author may also include commentary and/or guidance about how to make the applications work better in the context of the particular web framework that the cartridge 242 is supporting. The PaaS system may not automatically execute the default action hook 330, but instead may call the action hooks 330 during cartridge lifecycle changes based on action given to a control script of the cartridge 242.

The template directory 250 of implementations of the disclosure allows a cartridge author to provide a better experience for application developers utilizing the cartridge to support applications created by the application developers. The cartridge author can provide a sample application from the template directory that welcomes the application developer to the cartridge. In addition, the sample application can be used (e.g., by the application developers) as a template for their own applications that can be edited and pushed back up to the PaaS system. This speeds up the development process for applications created by application developers in order to get code to production more quickly.

In one implementation, an example use case for the template directory 250 includes providing a communication channel to pass information to application developers. For example, in the case of third-party services that utilize secret tokens, the cartridge author may embed an obtained secret token into the sample application 310 of the template directory. When an application created by the application developer downloads the sample application 310, the secret token may pass through to application created by the application developer. The secret token may then be utilized to connect to the third party service. Examples of third-party service may include, but are not limited to, software-as-a-Service that is providing email, remote logging, remote backups, and so on. Without the use of the template directory 250 as a communication channel between the cartridge author and the application created by the application developer, the application developer may have to resort to a different process to obtain the secret token, which can be time-consuming and burdensome.

FIG. 4 is a flow diagram illustrating a method 400 for providing a sample application of a cartridge in a template directory of the cartridge in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by nodes 232*a-c* described with respect to FIG. 2.

Method 400 begins at block 410, where a cartridge library is maintained by a node of a multi-tenant PaaS system. The node may include a VM providing processing space for a plurality of applications of the multi-tenant PaaS. The cartridge library includes cartridge packages that provide functionality for the applications of the multi-tenant PaaS. In one implementation, the cartridge library is an SCM repository, which was described in more detail above.

At block 420, a cartridge instance of the cartridge library is embedded in a gear of the multi-tenant PaaS. In one implementation, the gear is a resource-constrained processing space of a node (e.g., VM) of the multi-tenant PaaS. The gear is used to execute an application that utilizes functionality of the embedded cartridge instance. At block 430, a template directory is provided as part of the embedded cartridge instance. Then, at block 440, a sample application is executed from the template directory. In one implementation, the sample application demonstrates the functionality of the cartridge instance to an application developer of an application utilizing the cartridge instance. The sample application may be provided in the template directory of the cartridge by a cartridge author of the cartridge.

FIG. 5 is a flow diagram illustrating a method 500 for executing an application in a multi-tenant PaaS system by utilizing a template directory of a cartridge providing functionality of the application, according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by node 232*a-c* described with respect to FIG. 2.

Method 500 begins at block 510, where a sample application, default marker files, and action hooks are provided as part of a template directory of a cartridge instance. In one implementation, the cartridge instance is embedded in a gear of an application of a multi-tenant PaaS. The gear includes a resource-constrained processing space of a node (e.g., VM) of the multi-tenant PaaS that executes the applications of the multi-tenant PaaS.

At block 520, an updated version of the sample application is received. The updated version may be modified by an application developer of an application utilizing the cartridge instance for functionality of the application. The application developer may utilize a copy of the sample application, modify the code of the sample application per preferences of the application developer, and the push the modified sample application code back to the multi-tenant PaaS (e.g., to the node) for execution. In this way, the application developer does not have to start from scratch to create and develop an application that utilizes the cartridge instance in the multi-tenant PaaS.

At block 530, marker files corresponding to the cartridge instances are accessed. The accessed marked files for the cartridge instance may be based on the default marker files provided in the template directory. These default marker files may be modified, deleted, or added to for use by the application. In one implementation, the application developer may modify, delete, or add to the default marker files. The application developer may also configure the cartridge instance with these updated marker files.

Subsequently, at block 540, action hooks corresponding to the cartridge instances are accessed. The accessed action hooks for the cartridge instance may be based on the default action hooks provided in the template directory. These default action hooks may be used to modify functionality of the cartridge and/or add features to the cartridge during lifecycles changes of the cartridge. The cartridge author provides these action hooks in the template directory of the application. In one implementation, the application developer may modify the action hooks provided in the template directory. Lastly, at block 550, the application is executed on the multi-tenant PaaS utilizing the updated version of the sample application, the accessed marker files, and the accessed action hook.

Figure 6:
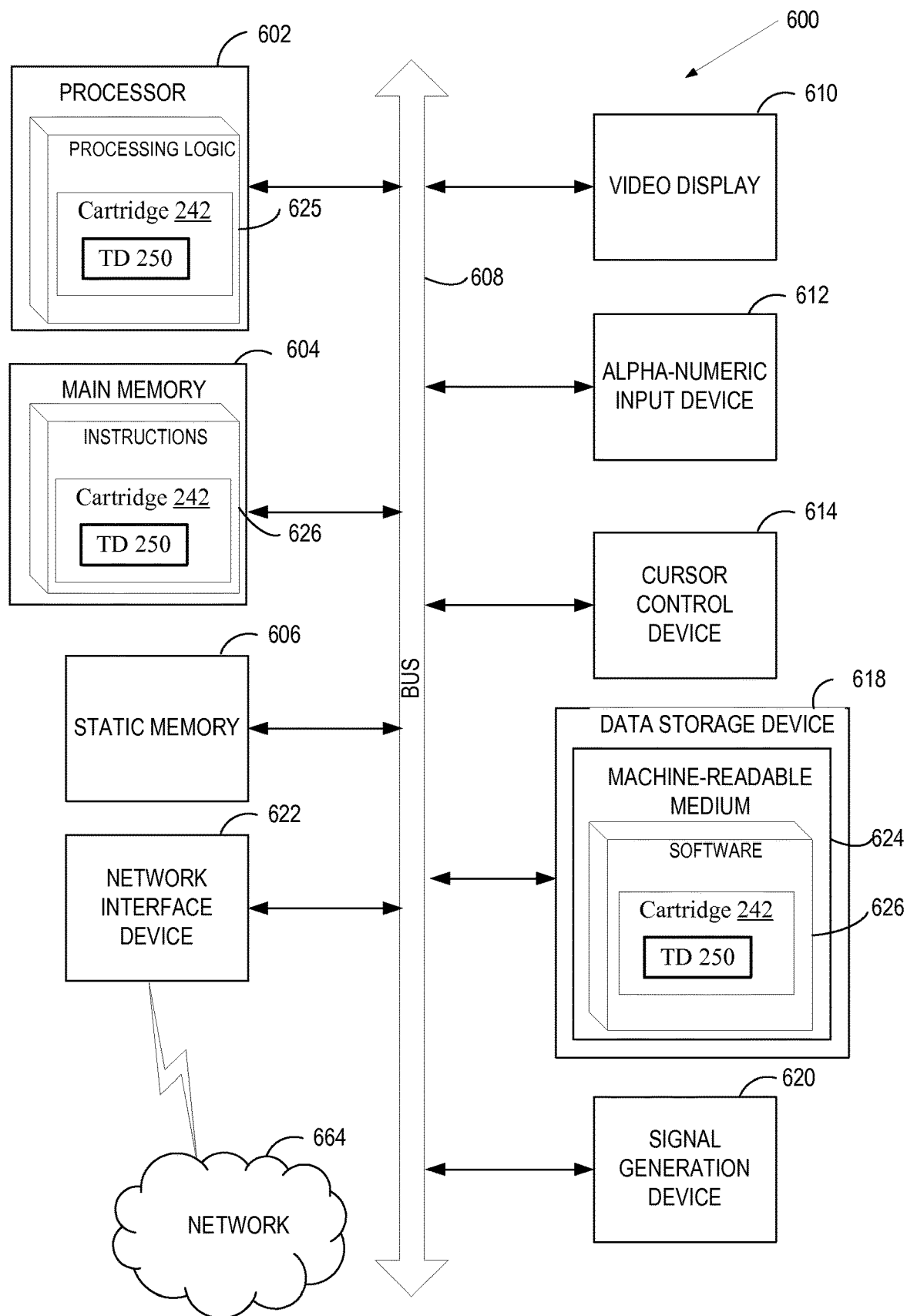
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a cartridge instance 242 to implement a template directory 250 in a multi-tenant PaaS, such as cartridge instance 242 and template directory 250 described with respect to FIGS. 2 and 3, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   maintaining, by a processing device executing a non-orchestrator node in a node layer of a multi-tenant Platform-as-a-Service (PaaS) system, a cartridge library on the node, the cartridge library comprising cartridge packages that provide functionality for applications executed by the node for the multi-tenant Platform-as-a-Service (PaaS) system;
   embedding, by the processing device executing the node, a cartridge instance from the cartridge library in a gear of the node, the cartridge instance comprising executable code to provide functionality to execute a first application on the node;
   providing a template directory as part of the cartridge instance, the template directory provided as source code and comprising a sample application in a language or framework packaged by the cartridge, the template directory accessible by the first application via the cartridge instance, and wherein the template directory is operable to be modified while the cartridge instance is being served by the PaaS system;
   receiving an update to a graphical design element of the cartridge instance while the cartridge instance is being served by the PaaS system;
   modifying the cartridge instance in view of the update to the graphical design element, while the cartridge instance is being served by the PaaS system;
   executing, by the processing device executing the node, the sample application from the template directory to demonstrate functionality of the cartridge instance to an application developer of the first application; and
   modifying, by the processing device, application code of the sample application to be utilized for the first application executed on the node.

2. The method of claim 1, wherein the cartridge instance provides functionality to execute the first application on the mufti-tenant PaaS system, the functionality comprising at least one of configuration templates, scripts, dependencies, or features to add to the first application, and wherein the gear comprises a resource-constrained processing space of the node to execute the first application.

3. The method of claim 1, wherein the template directory and the sample application are part of a cartridge package of the cartridge instance.

4. The method of claim 3, wherein the sample application is customized for the application developer.

5. The method of claim 1, wherein modifying the application code of the sample application further comprises:
   receiving a modified version of the sample application that is modified by the application developer; and
   executing the first application in view of the modified version of the sample application.

6. The method of claim 1, wherein the template directory comprises one or more default marker files comprising an empty file that is labeled as a marker to indicate to the node that the cartridge instance is to implement a particular functionality.

7. The method of claim 6, wherein the default marker files are at least one of modified, deleted, or added to the cartridge instance.

8. The method of claim 1, wherein the template directory comprises one or more action hooks comprising functionality that intercepts at least one of function calls, events, or messages passed between components of the multi-tenant PaaS system, the intercepting to allow behavior of the cartridge instance to be altered or augmented.

9. The method of claim 8, wherein the action hooks allow custom code to be added to the first application utilizing the cartridge instance, the custom code to at least one of make changes or add features to the functionality of the cartridge instance.

10. A system, comprising:
    a memory; and
    a processing device communicably coupled to the memory to execute a non-orchestrator node in a node layer of a multi-tenant Platform-as-a-Service (PaaS) system from the memory, the node to execute applications of the multi-tenant Platform-as-a-Service (PaaS) system, the processing device to:
       maintain a cartridge library on the node, the cartridge library comprising cartridge packages that provide functionality for applications executed by the node for a multi-tenant Platform-as-a-Service (PaaS) system;
       embed a cartridge instance from the cartridge library in a gear of the node, the cartridge instance comprising executable code to provide functionality to execute a first application on the node;
       provide a template directory as part of the cartridge instance, the template directory provided as source code and comprising a sample application in a language or framework packaged by the cartridge, the template directory accessible by the first application via the cartridge instance, and wherein the template directory is operable to be modified while the cartridge instance is being served by the PaaS system;
       receive an update to a graphical design element of the cartridge instance while the cartridge instance is being served by the PaaS system;
       modify the cartridge instance in view of the update to the graphical design element, while the cartridge instance is being served by the PaaS system;

execute the sample application from the template directory to demonstrate functionality of the cartridge instance to an application developer of the first application; and modify application code of the sample application to be utilized for the first application executed on the node.

11. The system of claim 10, wherein the cartridge instance provides functionality to execute the first application on the multi-tenant PaaS system, the functionality comprising at least one of configuration. templates, scripts, dependencies, or features to add to the first application, and wherein the gear comprises a resource-constrained processing space of the node to execute the first application.

12. The system of claim 10, wherein the template directory and the sample application are part of a cartridge package of the cartridge instance.

13. The system of claim 10, wherein the processing device to modify the application code of the sample application further comprises the processing device to:

receive a modified version of the sample application that is modified by the application developer; and execute the first application in view of the modified version of the sample application.

14. The system of claim 10, wherein the template directory comprises one or more default marker files comprising an empty file that is labeled as a marker to indicate to the node that the cartridge instance is to implement a particular functionality, wherein the default marker files are at least one of modified, deleted, or added to the cartridge instance.

15. The system of claim 10, wherein the template directory comprises one or more action hooks comprising functionality that intercepts at least one of function calls, events, or messages passed between components of the multi-tenant PaaS system, the intercepting to allow behavior of the cartridge instance to be altered or augmented, wherein the action hooks allow custom code to be added to the cartridge instance, the custom code to at least one of make changes or add features to the functionality of the cartridge instance.

16. A non-transitory machine-readable storage medium having instructions that, when accessed by a processing device, cause the processing device to:

maintain, by the processing device, a cartridge library on a non-orchestrator node in a node layer of a multi-tenant Platform-as-a-Service (PaaS) system, the cartridge library comprising cartridge packages that provide functionality for applications executed by the processing device for the multi-tenant Platform-as-a-Service (PaaS) system;

embed, by the processing device, a cartridge instance from the cartridge library in a gear, the cartridge instance comprising executable code to provide functionality to execute a first application on the node;

provide a template directory as part of the cartridge instance, the template directory provided as source code and comprising a sample application in a language or framework packaged by the cartridge, the template directory accessible by the first application via the cartridge instance, and wherein the template directory is operable to be modified while the cartridge instance is being served by the PaaS system;

receive an update to a graphical design element of the cartridge instance while the cartridge instance is being served by the PaaS system;

modify the cartridge instance in view of the update to the graphical design element, while the cartridge instance is being served by the PaaS system;

execute, by the processing device, the sample application from the template directory to demonstrate functionality of the cartridge instance to an application developer of the first application; and modify application code of the sample application to be utilized for the first application executed on the node.

17. The non-transitory machine-readable stocaae medium of claim 16, wherein the cartridge provides functionality to execute the first application on the multi-tenant PaaS system, the functionality comprising at least one of configuration templates, scripts, dependencies, or features to add to the first application, and wherein the gear comprises a resource-constrained processing space to execute the first application.

18. The non-transitory machine-readable storage medium of claim 16, wherein the processing device to modify the application code of the sample application further comprises the processing device to:

receive a modified version of the sample application that is modified by the application developer; and execute the first application in view of the modified version of the sample application.

19. The non-transitory machine-readable storage medium of claim 16, wherein the template directory comprises one or more default marker files comprising an empty file that is labeled as a marker to indicate that the cartridge instance is to implement a particular functionality, wherein the default marker files are at least one of modified, deleted, or added to the cartridge instance.

20. The non-transitory machine-readable storage medium of claim 16, wherein the template directory comprises one or more action hooks comprising functionality that intercepts at least one of function calls, events, or messages passed between components of the multi-tenant PaaS, the intercepting to allow behavior of the cartridge instance to be altered or augmented, wherein the action hooks allow custom code to be added to the cartridge instance, the custom code to at least one of make changes or add features to the functionality of the cartridge instance.

* * * * *